Figure 3:
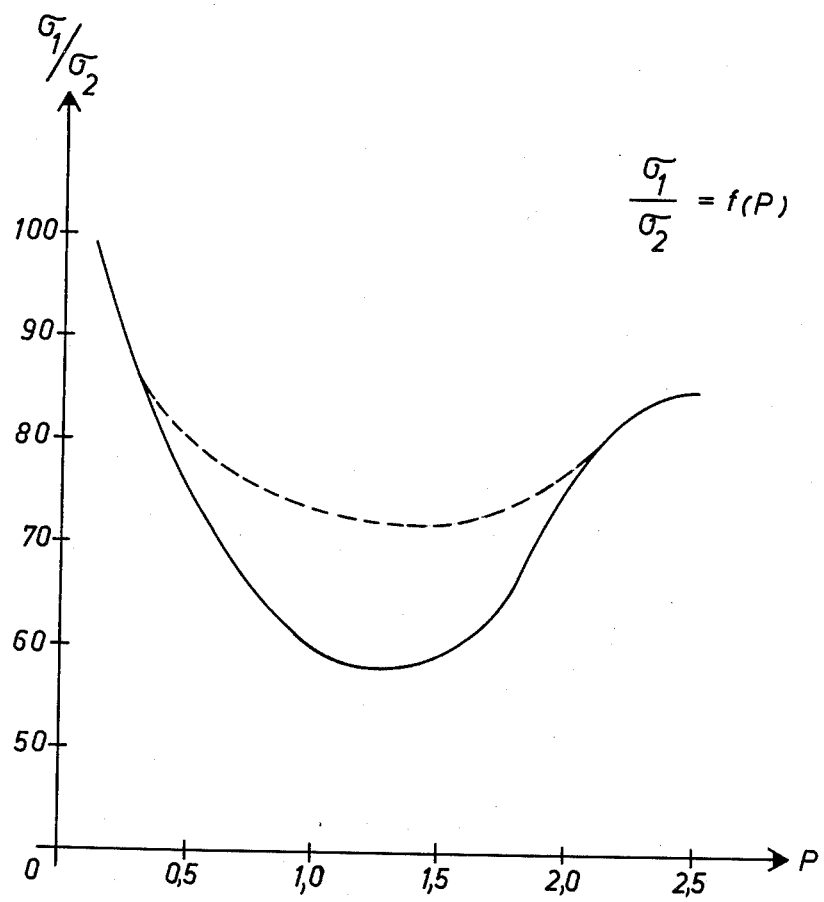

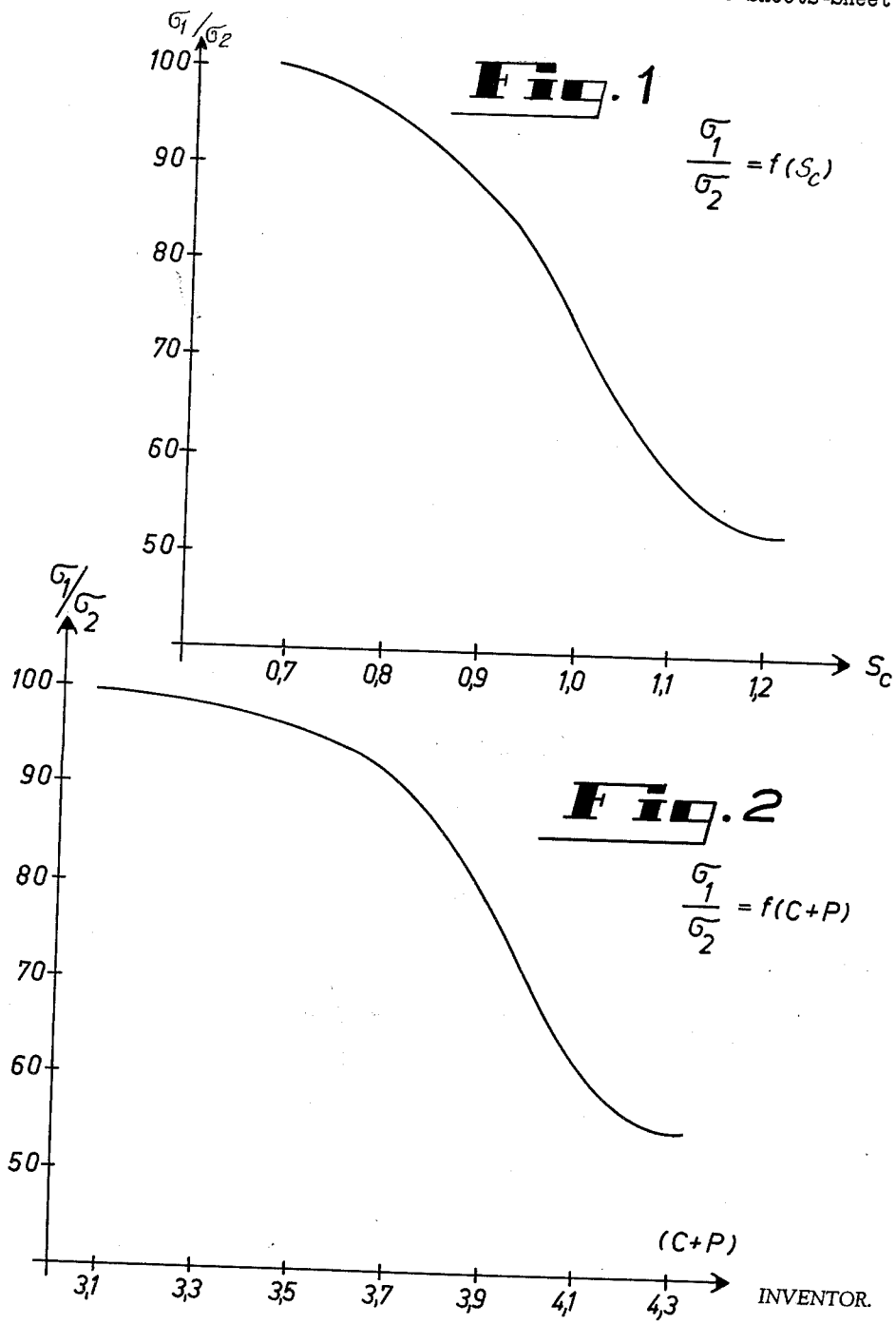

Oct. 2, 1962     M. V. BERG     3,056,196
METHOD FOR WELDING EUTECTIC OR SUPER EUTECTIC
CAST IRON PIECES ESPECIALLY
CAST IRON TUBES
Filed July 2, 1958     3 Sheets-Sheet 3
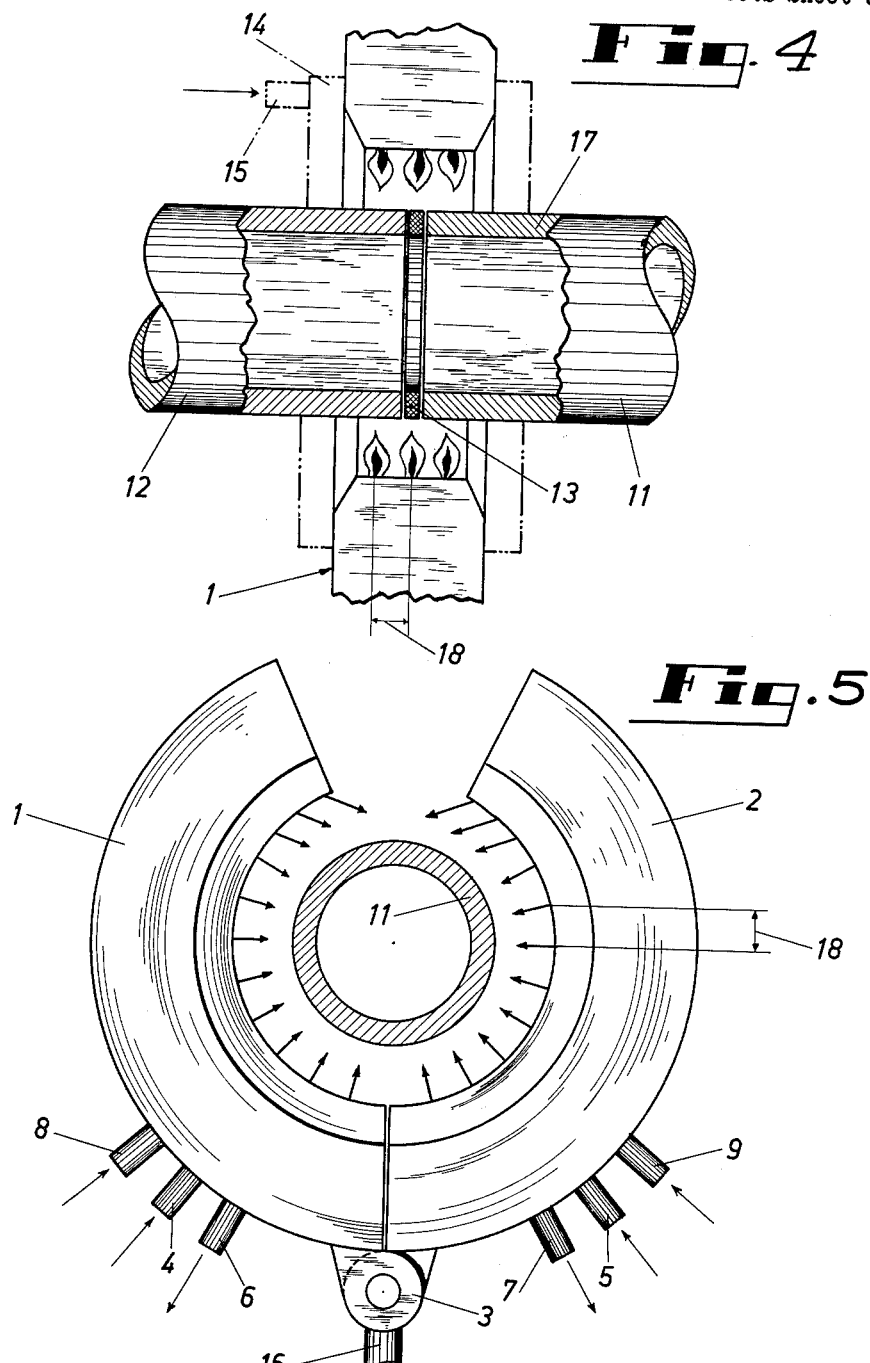
INVENTOR.
Manfred Voldemar Berg
BY

United States Patent Office 3,056,196
Patented Oct. 2, 1962

3,056,196
METHOD FOR WELDING EUTECTIC OR SUPER EUTECTIC CAST IRON PIECES ESPECIALLY CAST IRON TUBES
Manfred V. Berg, Goteborg H, Sweden, assignor to Agenturfirma Emvebe M. Berg, Goteborg, Sweden, a corporation of Sweden
Filed July 2, 1958, Ser. No. 746,259
Claims priority, application Sweden June 24, 1958
9 Claims. (Cl. 29—496)

Gas butt welding of work pieces of eutectic or super eutectic cast iron having a content of phosphorus of about .5% or more involves considerable difficulties. Especially in mass production, it is difficult to obtain reliable welding joints.

The invention enables the welding of such cast iron, such as gas butt welding of cast iron pipe sections by the interposing of a ring of alloy steel or cast iron between ends of the sections under an initial pressure of about 5–15 lbs. per square inch. Then heat is applied to the ring to bring it to welding temperatures, and then, after heat treatment, the sections and ring are axially forced together with the upsetting or butting pressure between 25 and 75 pounds of sq. in. welding area, the butting movement length being between ⅛" and ⅜".

The ring may have a composition of .1–3.2% C, 2.0–3.5% Si, .3–1.0% Mn, .2–2.5 P, as little sulphur as possible with a maximum of 1.2%, plus alloying elements and the remainder iron. Such a ring will enable the gas butt welding, of work pieces of eutectic and super eutectic cast iron tubes or pipes in particular.

The invention will in the following be elucidated with reference to the accompanying drawings. In the drawings:

FIGS. 1, 2, and 3 show by means of diagrams the relation between the strength in the welded joint and the strength in the basic material as a function of contents of different alloying elements in the cast iron.

FIGS. 4 and 5 show in a longitudinal section and in an end elevation, respectively, a burner which is suitable to be used for the carrying out of the method according to the present invention.

The weldability of cast irons having a chemical composition with the saturated factor $S_c$ between .7 and 1.1, said factors $S_c$ calculated according to Tobias' and Brinkman's formula according to which $$S_c = \frac{\text{Percent C}}{4.23 - .312\ Si - .33\ P + .066\ Mn.}$$

the contents of phosphorus in said cast iron simultaneously being between 0 and 1.2% is shown diagrammatically in FIG. 1. The curve of FIG. 1 showing the relation between the tensile strength $\sigma_2$ in the basic material shows the ratio of the former to the latter as a function of the saturated factor $S_c$. From this diagram it could be read that if $S_c = 1.1$, then is $\sigma_1/\sigma_2 \cong 60\%$
$S_c = 1$ then is $\sigma_1/\sigma_2 \cong 72\%$
$S_c = .9$ then is $\sigma_1/\sigma_2 \cong 88\%$
$S_c = .8$ then is $\sigma_1/\sigma_2 \cong 95\%$
$S_c = .7$ then is $\sigma_1/\sigma_2 \cong 100\%$ In FIG. 2 is shown by means of a diagram the relation $\sigma_1/\sigma_2$ as a function of the total amount of carbon and phosphorus $(C+P)$ in the tube material.

From this diagram it could be read that when $C+P = 3.1\%$ then is $\sigma_1/\sigma_2 \cong 99\%$
$C+P = 3.3\%$ then is $\sigma_1/\sigma_2 \cong 98\%$
$C+P = 3.5\%$ then is $\sigma_1/\sigma_2 \cong 96\%$
$C+P = 3.7\%$ then is $\sigma_1/\sigma_2 \cong 92\%$
$C+P = 3.9\%$ then is $\sigma_1/\sigma_2 \cong 88\%$ As is obvious from the diagrams, the weldability decreases considerably with an increase of the value of $S_c$ from $S_c \ge 1$ and if the total amount of $C+P$ exceeds the weld falls below 70% effectiveness.

Steps taken, for instance variations in the upsetting or butting pressure, the butting movement speed, the butting movement length and the mutual variations of these factors as well as variations in the heating method has to some extent advantageously influenced the welding results shown in the diagrams in FIGS. 1 and 2.

Thus, the badly weldable range of cast iron, especially with regard to the pressure welding, begins at $S_c = 1$ and $C+P=4.0\%$ and continues with worse results if the value of $S_c$ and $C+P$ are further increased.

In order to further expand the scope of the method according to the present invention for welding cast iron, systematic tests have been made while using inserted materials for examination of the possibility of obtaining satisfactory welding results also within this normally badly weldable range of cast iron. It has thereby turned out that according to the invention the insertion of certain alloying elements in the welded joint during butt welding of, for instance cast tubes which are either centrifugal, string or sand cast surprisingly good results could be obtained when either of the following two procedures are used:

(a) By treating the welding surfaces which are to be heated to more than 1475° F. with a pasty fluxing material containing inter alia the alloying elements mentioned here below in powdered form.

(b) By inserting, as stated in the aforesaid, a ring between the surfaces to be welded, said ring being of a specially alloyed cast iron or steel and having the same outer and inner diameters as the adjacent tubes. The ring being pressed to abut against the welding surfaces of the tubes with a minor butt pressure of about 5–10 pounds per sq. in. welding area before starting with the heating.

The arrangement of the ring between the surfaces to be welded is shown in FIG. 4. According to the alternative "a" here above, the pasty fluxing material, for instance the one known in the market as "Gussolit-paste" or a similar product, is mixed up to 6 to 7% per weight of said fluxing material with powdered nickel, copper and molybdenum in the relation 10:10:1.

The pasty fluxing material should also contain finely powdered graphite, for instance about 2% of the weight of the fluxing material. According to the alternative "b," the ring of alloyed cast iron of steel should preferably have the following chemical composition:

$C = .1–2.5\%$, preferably between 1.7 and 2.5%.
$Si = 2.5–3.5\%$, preferably between 2.8 and 3.2%
$Mn = 2.5–3.5\%$, preferably between .35 and .45%
$P = 1.5–2.5\%$, preferably between 1.7 and 2.0%
$S$=as low as possible, preferably not exceeding .07%
$Ni = 6.0–12.0\%$, preferably between 8.0–10.0%
$Cu = 8.0–10.0\%$ if the contents of carbon is between 1.7 and 2.5% or
$Cu = 10.0–13.0\%$ if the contents of carbon is between .1 and 1.7%
$Mo = .5–1.5\%$, preferably between .7 and 1.2%.
Remainder Fe.

Systematic tests with increased contents of phosphorus from .5% and more have given as results the most astonishing discovery that at extremely high contents of phosphorus, at e.g. 1.5–2.5%, the welding results could considerably be increased without use of filling materials.

In FIG. 3 there is shown by means of a diagram the relation between tension strength $\sigma_1$ of the joint and the tension strength $\sigma_2$ of the basic material as a function of the contents of phosphorus with an unbroken line. With a broken line there is shown a diagram of the relation between $\sigma_1$ and $\sigma_2$ as a function of the content of phosphorus in welded joints of cast iron with alloying elements in the joint.

It has also turned out at high contents of phosphorus set forth here above, that the total amount of carbon and silicon should be very low or as a maximum of the average values, i.e. the contents in carbon between 3.0 and 3.4%, preferably 3.0 and 3.2%, and the contents of silicon between 2.0 and 2.8%.

In gas butt welding, work pieces of cast iron containing carbon to an extent between 3.0 and 3.4% and silicon between 2.0 and 2.8%, the contents of phosphorus being between 1.5 and 2.5% there will be practically no need of grafting or filling in the welded joint with alloying elements. In order to protect the welded joint from oxidations and losses in silicon, the welded surfaces may be treated with a pasty fluxing material containing up to about 2% of powdered graphite.

In the welding together of cast iron pieces containing the aforesaid high contents of phosphorus, the butting pressure should be between 10 and 35 pounds per sq.in. welding area and the length of the butting movement shall be between 5/64" and 13/64", in connection with tubes having thin walls between 5/64" and 8/64".

It is further advisable in connection with said high contents of phosphorus to have the contents of manganese and sulphur at higher values, viz. Mn between .5 and 1.0% and S between .1 and .18%.

The theoretical explanation of the increased weldability is probably to be found in the possibility of the $\alpha$-iron at high temperatures to take up greater amounts of phosphorus in the solution, a smaller quantity of phosphorus thereby being separated as phosphide eutecticum.

*Nickel, Molybdenum and Copper as Alloying Elements*

Nickel and molybdenum are well known alloying elements for increasing the strength of cast iron, especially at high temperatures, and for forcing the graphite to separate in powdered rosette-form. The locally heated cast iron material at the weld is modified by means of diffusion of said alloying elements into the heated welding zone to give not only an increased tenacious structure and an increased pressure strength but also a better binding. Nickel has also a capacity to dissolve the formed cementite during the rapid cooling of the welded zone and in such a way there is obtained a softer welded joint without any tensions in it.

Copper could be dissolved in cast iron in amounts up to 4 to 5%. Any excess of added copper, i.e. undissolved copper, is separated at the solidification of the cast iron in the form of drops (copper fuses at 1981° F.). These copper particles, having at the crystallizing of the graphite still the form of drops, act as additive material during the subsequent separating of graphite, i.e. they bring out a fine eutectic graphite structure but they simultaneously lower the eutectic solidification point. For this reason, the addition of copper in amounts somewhat exceeding 5% in the grafting or additive material is of extreme importance, especially in the welding of eutectic or super eutectic tube material of cast iron.

*The Heat Operation*

The heating of the welding area can preferably be carried out by means of a burner known per se and shown in FIGS. 4 and 5. This ring burner comprises two halves 1, 2 connected to each other by means of hinges 3. Each ring half 1 or 2, respectively, is provided with inlets 4, 5, outlets 6, 7 for cooling water and inlets 8, 9 for gas. When the ring halves 1, 2 are closed, they will enclose between them, with exception for an upper opening 10, the work pieces 11, 12 to be welded together. The gas fed into the burner leaves the latter through openings which are disposed or provided with jets in such a way that all of the flames with exception of the three flames close to the opening 10 are directed radially towards the ends of the cylindrical work pieces (FIG. 5). The diameter of the gas outlets is preferably chosen between 7/256" and 9/256" in correspondence with the tubes to be welded.

As is obvious from FIG. 4, there are in the shown embodiment three rows of flames. The central row of flames is directed towards the ring 13 situated between the ends of the tubes while the two outer rows of flames heat the tube ends as well as the ring. By this arrangement the ring will fuse first. The thickness, or height, of the ring 13 is preferably half the thickness of the tube wall 17. In order to protect the heated metal from oxidation, it is possible, as indicated with dash and dot lines in FIG. 4, to encase the area to be welded and its surroundings with a box 14 or the like having an inlet 15 through which is led any suitable inert gas, e.g. hydrogen or any other gas acting in the same way, for instance rare gases or methane gas etc. For the centering of the work piece in the burner, the latter is at its lower portion, i.e. at the hinge 3, provided with a pipe socket 16 having threads.

The distance $c$ between the gas outlets in each row and the mutual distance between the three rows is about 3/8" but also other distances could be chosen in dependence of the heat concentration, if a graft ring 13 is used or not, as well as of the wall thickness of the used tubes. The arrangement of the flames in relation to the welded joint with the ring as well as the distance 18 between the points of the core flames and the outer surface of tubes is shown in FIG. 4. Said distance 18 should be chosen preferably between 3/8" and 1¼" as it has turned out that with such distances it is possible to obtain a better distribution of heat in the welded joint. If the distance 18 between the surface of the tube decrease 3/8", the burner should be given an oscillating motion in a plane perpendicular to the longitudinal direction of the tube over an angle of 15°–20°.

During welding in accordance with the alternative "$a$" the welding area is heated to fusion, i.e. to about 2100° F.

During welding in accordance with the alternative "$b$" while using a grafting ring, the ring will reach fusion temperature before the jointing surfaces due to the heat concentration to the centre line. As soon as the ring 13 has reached fusion temperature, the butting takes place.

For the burner feed there may be used a mixture of oxygen and acetylene burning with a normal welding flame. In order to obtain a good protection against oxidation, it is advisable to use a slightly reducing flame.

It is also advisable to use a mixture of oxygen and gasolene containing about 60% oxygen and about 40% gasolene but also other gas mixtures could be used.

Test weldings made have shown that acceptable results could be obtained without use of a protective gas. For gas butt welding cast tubes having flanges and muffs, the burner should be composed of two symmetric halves also this part of the engine could have a cheap form of work pieces as well as to again surround the same.

The gas butt welding machine has to carry out two main operations: heating and butting. A manually operated machine thus could be rather simple in its construction if the burner could be centered relative the tube pieces clamped between the clamping jaws. A movable stand is arranged for the butting operation, said stand being moved in an hydraulic, pneumatic or mechanic way. As the butting pressure at the gas butt welding has rather low values, i.e. between 25 and about 75 pounds per sq. in. welding area, and as the butting length could be only between 5/64" and maximum 16/64" to 18/64" also this part of the engine could have a cheap form of design.

The machine should preferably also be provided with an optical instrument (not shown) for registration of the temperature known per se and with an apparatus for measuring the butting pressure.

The Butting Operation

The butting operation could in a way known per se be carried out by means of a machine, pneumatic or hydraulic device.

The butting of eutectic or super-eutectic cast iron has to be carried out with a considerable speed but with a limited length. The butting pressure for the butting of tubes should be between 10 and 35 pounds per sq. in. welding area and the length of the butting movement between 5/64" and 13/64".

The butting pressure for the butting of tubes with a grafting ring between the joint surfaces shall be between 25 and 75 pounds per sq. in. welding area and the length of the butting movement shall be between 10/64" and 18/64". The burner is extinguished simultaneously with the butting operation. The alloying elements are distributed to the two tube ends by means of diffusion and they increase the strength properties of the welded joint.

The welded tube is left in the machine for about 30 to 60 seconds after the weld has been made so as to rapidly lower the temperature in the welded joint to about 930° F. and the tube is thereupon taken out of the machine.

A subsequent annealing may, if desired, be made in the machine with the same burner during a period of about 5 minutes at a temperature of 1650° F. to 1740° F., the burner then oscillating over 20° in a plane perpendicular to the longitudinal axis of the tube and simultaneously being moved in the longitudinal direction of the tube at a distance of about 4" over the welded joint.

The method of gas butt welding of cast iron pieces with grafting material could advantageously be used in the joining of centrifugal or string cast tubes for pipe lines for oil or gas, in the manufacture of centrifugal or string cast tubes having double flanges or double muffs.

What I claim is:

1. A method for welding tubular eutectic or super eutectic cast iron work pieces having a phosphorus content between .5 and 1.5% comprising alining the work pieces; disposing a ferrous alloy ring of substantially the same diameters as and between the work pieces and in contact with the ends of the work pieces; applying liquid fluxing material to the ring and end portions of the work piece; pressing the work pieces against the ring with a force of between 5 and 15 lbs. per square inch of area of contact; then applying heat to the ring sufficiently to fuse same; then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of:

| | |
|---|---|
| Carbon | between .1 and 3.2%. |
| Silicon | between 2.0 and 3.5%. |
| Manganese | between .3 and 1.0%. |
| Phosphorus | between 1.5 and 2.5%. |
| Nickel | between 6.0 and 12.0%. |
| Copper | between 8.0 and 13.0%. |
| Molybdenum | between .5 and 1.5%. |
| Sulphur no more than | 1.2%. |
| Iron | as balance. |

2. A method for welding tubular eutectic or super eutectic cast iron work pieces having a phosphorus content between .5 and 1.5% comprising alining the work pieces; disposing a ferrous alloy ring of substantially the same diameters as and between the work pieces and in contact with the ends of the work pieces; applying liquid fluxing material to the ring and end portions of the work piece; pressing the work pieces against the ring with a force of between 5 and 15 lbs. per square inch of area of contact; then applying heat to the ring sufficiently to fuse same; then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of:

| | |
|---|---|
| Carbon | between .1 and 2.5%. |
| Silicon | between 2.8 and 3.2%. |
| Manganese | between .35 and .45%. |
| Phosphorus | between 1.7 and 2.0%. |
| Nickel | between 8.0 and 10.0%. |
| Copper | between 8.0 and 13.0%. |
| Molybdenum | between .7 and 1.2%. |
| Sulphur no more than | 1.2%. |
| Iron | as balance. |

3. A method as claimed in claim 1, the carbon content being between 1.7 and 3.2% and the copper content being between 8.0 and 10.0%.

4. A method as claimed in claim 1, the carbon content being between .1 and 1.7% and the copper content being between 10.0 and 13.0%.

5. A method for welding tubular cast iron work pieces having a phosphorus content between .5 and 1.5% comprising alining the work pieces; disposing a ferrous alloy ring of substantially the same diameters of and between the work pieces and in contact with the ends of the work pieces; the axial thickness of the ring being about half the thickness of the walls of the work pieces; applying liquid fluxing material to the ring and end portions of the work pieces; pressing the work pieces against the ring with a force of between 5 and 15 lbs. per square inch of area of contact; then applying heat to the ring sufficiently to fuse same, then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of:

| | |
|---|---|
| Carbon | between .1 and 3.2%. |
| Silicon | between 2.0 and 3.5%. |
| Manganese | between .3 and 1.0%. |
| Phosphorus | between .2 and 2.5%. |
| Nickel | between 6.0 and 12.0%. |
| Copper | between 10.0 and 13.0%. |
| Molybdenum | between .5 and 1.5%. |
| Sulphur no more than | 1.2%. |
| Iron | As balance. |

6. A method for welding tubular cast iron work pieces having a phosphorus content between .5 and 1.5% comprising alinging the work pieces; disposing a ferrous alloy ring of substantially the same diameters of and between the work pieces and in contact with the ends of the work pieces; the axial thickness of the ring being about half the thickness of the walls of the work pieces; applying liquid fluxing material to the ring and end portions of the work piece; pressing the work pieces against the ring with a force of between 5 and 15 lbs. per square inch of area of contact; then applying heat by means of a gas flame to the ring sufficiently to fuse same, then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of:

| | |
|---|---|
| Carbon | between .1 and 3.2%. |
| Silicon | between 2.0 and 3.5%. |
| Manganese | between .3 and 1.0%. |
| Phosphorus | between .2 and 2.5%. |
| Nickel | between 6.0 and 12.0%. |
| Copper | between 10.0 and 13.0%. |
| Molybdenum | between .5 and 1.5%. |
| Sulphur no more than | 1.2%. |
| Iron | As balance. |

7. A method for welding tubular cast iron work pieces having a phosphorus content between .5 and 1.5% comprising alining the work pieces; disposing a ferrous alloy ring of substantially the same diameters of and between the work pieces and in contact with the ends of the work pieces; the axial thickness of the ring being about half the thickness of the walls of the work pieces; applying liquid fluxing material to the ring and end portions of the work piece; pressing the work pieces against the ring with a force of between 5 and 15 lbs. per square inch of area of contact; then applying heat by means of a slightly reducing gas flame to the ring sufficiently to fuse same, then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of—

| | |
|---|---|
| Carbon | between .1 and 2.5%. |
| Silicon | between 2.8 and 3.2%. |
| Manganese | between .35 and .45%. |
| Phosphorus | between 1.7 and 2.0%. |
| Nickel | between 8.0 and 10.0%. |
| Copper | between 8.0 and 13.0%. |
| Molybdenum | between .7 and 1.2%. |
| Sulphur no more than | 1.2%. |
| Iron | As balance. |

8. A method for welding tubular cast iron work pieces having a phosphorus content between .5 and 1.5% comprising alining the work pieces; disposing a ferrous alloy ring of substantially the same diameters as and between the work pieces and in contact with the ends of the work pieces, the axial thickness of the ring being about half that of the work pieces; applying liquid fluxing material to the ring and end portions of the work piece, pressing the work pieces against the ring with a force of between 5 and 15 lbs. per square inch of area of contact; then applying heat to the ring sufficiently to fuse same; then withdrawing the heat and simultaneously forcing the work pieces against the ring with a force of between 25 and 75 lbs. per square inch in weld area with an overall relative movement of between 10/64 and 18/64 inch of the pieces, said ring having essentially a composition of—

| | |
|---|---|
| Carbon | between .1 and 3.2%. |
| Silicon | between 2.0 and 3.5%. |
| Manganese | between .3 and 1.0%. |
| Phosphorus | between .2 and 2.5%. |
| Sulphur no more than | 1.2%. |
| Strengthening elements in minor amounts. | |
| Iron | As balance. |

9. A method for welding tubular cast iron work pieces having a phosphorus content between .5 and 1.5% comprising alining the work pieces; disposing a ferrous alloy ring of substantially the same diameters as and between the work pieces and in contact with the ends of the work pieces, the axial thickness of the ring being about half the thickness of the walls of the workpieces; applying liquid fluxing material to the ring and end portions of the work piece; pressing the work pieces against the ring with a force of between 5 and 15 lbs. per square inch of area of contact; then applying heat to the ring sufficiently to fuse same; then withdrawing the heat and simultaneously forcing the work pieces against the ring with a force of between 25 and 75 lbs. per square inch in weld area with an overall relative movement of between 10/64 and 18/64 inch o fthe pieces, said ring having essentially a composition of:

| | |
|---|---|
| Carbon | between .1 and 2.5%. |
| Silicon | between 2.8 and 3.2%. |
| Manganese | between .35 and .45%. |
| Phosphorus | between 1.7 and 2.0%. |
| Sulphur no more than | 1.2%. |
| Strengthening elements in minor amounts. | |
| Iron | As balance. |

References Cited in the file of this patent

UNITED STATES PATENTS

| | | |
|---|---|---|
| 2,231,027 | Renner | Feb. 11, 1941 |
| 2,392,824 | Lytle et al. | Jan. 15, 1946 |
| 2,834,871 | Berg | May 13, 1958 |

FOREIGN PATENTS

| | | |
|---|---|---|
| 531,206 | Belgium | Sept. 15, 1954 |